United States Patent
Nanda et al.

(10) Patent No.: US 9,521,584 B2
(45) Date of Patent: Dec. 13, 2016

(54) METHOD AND APPARATUS FOR MANAGING DATA FLOW THROUGH A MESH NETWORK

(75) Inventors: Sanjiv Nanda, Ramona, CA (US); Saishankar Nandagopalan, San Diego, CA (US); Santosh Abraham, San Diego, CA (US); Xiaofei Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 786 days.

(21) Appl. No.: 11/549,849

(22) Filed: Oct. 16, 2006

(65) Prior Publication Data

US 2007/0124443 A1 May 31, 2007

Related U.S. Application Data

(60) Provisional application No. 60/727,642, filed on Oct. 17, 2005.

(51) Int. Cl.
*G06F 15/16* (2006.01)
*H04W 28/12* (2009.01)
(Continued)

(52) U.S. Cl.
CPC ............ *H04W 28/12* (2013.01); *H04W 74/06* (2013.01); *H04W 84/18* (2013.01); *Y02B 60/50* (2013.01)

(58) Field of Classification Search
CPC ...... H04W 28/12; H04W 74/06; H04W 84/18; Y02B 60/50
(Continued)

(56) References Cited

U.S. PATENT DOCUMENTS 6,067,301 A * 5/2000 Aatresh .................. 370/418
6,665,495 B1 * 12/2003 Miles et al. .............. 398/54
(Continued)

FOREIGN PATENT DOCUMENTS

EP 1 548 990 A 6/2005
JP 2002009841 A 1/2002
(Continued)

OTHER PUBLICATIONS

Seongkwan Kim et al, "A high-throughput MAC strategy for next-generation WLANs," World of Wireless Mobile and Multimedia Networks, 2005. WoWMoM 2005. Sixth IEEE International Symposium on a Taormina-Giardini Naxos Italy Jun. 13-16, 2005, Piscataway, NJ, USA, IEEE Jun. 13, 2005, XP010811091, pp. 278-285.
(Continued)

*Primary Examiner* — Viet Vu
(74) *Attorney, Agent, or Firm* — Steven R. Thiel

(57) ABSTRACT

Traffic streams through mesh points in a mesh network are managed. Data arriving at the mesh point are aggregated in packet queues. The packet queues segregate arriving data by the data's Quality of Service (QoS) requirement. An appropriate communication channel is selected. The communication channel is accessed through a contention access schema. An M-Request-To-Send (MRTS) message is sent to potential receiving mesh points with receiving mesh points responding with an M-Clear-to-Send (MCTS) message. Data from the packet queues is transmitted to the next mesh point. A mesh point power save mode allows battery operated mesh points to sleep preserving power.

27 Claims, 12 Drawing Sheets

(51) Int. Cl.
   *H04W 74/06* (2009.01)
   *H04W 84/18* (2009.01)
(58) Field of Classification Search
   USPC .......................................... 709/223; 370/235
   See application file for complete search history.

(56) References Cited

U.S. PATENT DOCUMENTS

| | | | |
|---|---|---|---|
| 6,788,697 B1* | 9/2004 | Aweya et al. | 370/412 |
| 6,981,064 B1* | 12/2005 | Phadnis et al. | 709/250 |
| 7,075,890 B2* | 7/2006 | Ozer et al. | 370/230 |
| 2001/0024446 A1* | 9/2001 | Craig et al. | 370/412 |
| 2001/0033581 A1* | 10/2001 | Kawarai et al. | 370/468 |
| 2002/0004379 A1 | 1/2002 | Gruhl et al. | |
| 2002/0067736 A1* | 6/2002 | Garcia-Luna-Aceves et al. | 370/442 |
| 2002/0126675 A1* | 9/2002 | Yoshimura | H04L 47/10 370/395.21 |
| 2003/0053469 A1* | 3/2003 | Wentink | 370/412 |
| 2003/0067892 A1* | 4/2003 | Beyer et al. | 370/328 |
| 2004/0177087 A1* | 9/2004 | Wu et al. | 707/102 |
| 2004/0258039 A1 | 12/2004 | Stephens | |
| 2005/0002364 A1* | 1/2005 | Ozer et al. | 370/338 |
| 2005/0036448 A1* | 2/2005 | Leeuwen | 370/235 |
| 2005/0047383 A1 | 3/2005 | Yoshida | |
| 2005/0141465 A1 | 6/2005 | Kato et al. | |
| 2005/0144327 A1* | 6/2005 | Rabie et al. | 709/249 |
| 2006/0056382 A1* | 3/2006 | Yamada et al. | 370/349 |
| 2006/0215582 A1 | 9/2006 | Castagnoli et al. | |
| 2006/0268716 A1* | 11/2006 | Wijting et al. | 370/235 |
| 2007/0189249 A1* | 8/2007 | Gurevich | H04L 45/20 370/338 |

FOREIGN PATENT DOCUMENTS

| | | | |
|---|---|---|---|
| JP | 2004343509 A | 12/2004 | |
| JP | 2005045637 A | 2/2005 | |
| JP | 2005079985 A | 3/2005 | |
| JP | 2005184727 A | 7/2005 | |
| WO | WO 03/085891 A | 10/2003 | |
| WO | WO 2006/027964 | 3/2006 | |

OTHER PUBLICATIONS

Lorchat, J. et al, "Energy saving in IEEE 802.11 communications using frame aggregation," Global Telecommunications Conference, 2003, Conference Proceedings, San Francisco, Dec. 1-5, 2003. IEEE Global Telecommunications Conference, New York, NY USA vol. 7, Dec. 1, 2003, XP010677504, pp. 1296-1300.

Yang Xiao, "Packing mechanisms for the IEEE 802.11n wireless LANs," Global Telecommunications Conference, 2004. GLOBECOM '04. IEEE, Dallas, TX USA, vol. 5, Nov. 29, 2004, Piscataway, NJ, USA, IEEE Nov. 29, 2004, XP010758325, pp. 3275-3279.

Deyun Gao et al, "Physical rate based admission control for HCCA in IEEE 802.11e WLANs," Advanced Information Networking and Applications, 2005. AINA 2005, 19th International Conference on Taipei, Taiwan Mar. 25-30, 2005, Piscataway, NJ, USA, IEEE, Mar. 25, 2005, XP010789841, pp. 479-483.

Gyung-Ho Hwang et al, "Fast retransmission mechanism for VoIP in IEEE 802.11e wireless LANs," Vehicular Technology Conference, 2004. VTC2004-Fall. 2004 IEEE 60th Los Angelees, CA, USA, Sep. 26-29, 2004, Piscataway, NJ, USA, IEEE, XP010790526, pp. 4996-5000.

Siris V. A. et al, "Achieving Serice Differentiation and High Utilization in IEEE 802.11," Internet Citation, Jun. 2003, XP002301409, http://www.ics.forth.gr/netlab/publications/2003.tr322.sd_802.11.pdf.

Yang Xiao et al, "Differentiation, QoS guarantee, and optimization for real-time traffic over one-hop ad hoc networks," IEEE Transactions on Parallel and Distributed Systems, IEEE Service Center, Los Alamitos, CA, USA, vol. 16, Issue 6, Jun. 2005, XP011131058, pp. 538-549.

Jenhui Chen et al, "AMNP: ad hoc multichannel negotiation protocol for multihop mobile wireless networks," Communications, 2004 IEEE International Conference on Paris, France Jun. 20-24, 2004, Piscataway, NJ, USA, IEEE, XP010712375, pp. 3607-3612 vol. 6.

Guido R. Hiertz et al, "Mesh Networks Alliance (MNA) Proposal IEEE 802.11—MAC Sublayer Functional Description IEEE 802.11—Mesh WLAN Security," Internet Citation, http://www.ieee802.org/11/DocFiles/05/11-05-0605-02-000s-mesh-networks-alliance-proposal.doc, May 2005, XP007901169.

Fukuda Y. et al, "Decentralized access point selection architecture for wireless LANs deployability and robustness," Vehicular Technology Conference, 2004. VTC2004-Fall. 2004 IEEE 60th Los Angeles, CA, USA, Sep. 26-29, 2004, Piscataway, NJ, USA, IEEE, XP010786793, pp. 137-145.

Loyola L. et al, "A Multi-channel infrastructure based on DCF access mechanism for Wireless LAN Mesh Networks compliant with IEEE 802.11," Communications, 2005 Asia-Pacific Conference on Perth, Western Australia Oct. 3-5, 2005, Piscataway, NJ, USA, IEEE, Oct. 3, 2005, XP010860831, pp. 497-501.

Fukuda Y. et al, "Analysis of access point selection strategy in wireless Ian LAN," Vehicular Technology Conference, 2005. VTC2005-Fall. 2005 IEEE 62nd Dallas, TX, USA, Sep. 25-28, 2005, Piscataway, NJ, USA, IEEE, Sep. 25, 2005, XP010878910, pp. 2532-2536.

Jain N. et al, "A multichannel CSMA MAC protocol with receiver-based channel selection for multihop wireless networks," Computer Communications and Networks, 2001. Proceedings. Tenth International Conference on Oct. 15-17, 2001, Piscataway, NJ, USA, IEEE, Oct. 15, 2001, XP010562128, pp. 432-439.

Raniwala A. et al, "Architecture and algorithms for an IEEE 802.11-based multi-channel wireless mesh network," INFOCOM 2005. 24th Annual Joint Conference of the IEEE Computer and Communications Societies. Proceedings IEEE Miami, FL, USA, IEEE, Mar. 13, 2005, XP010829112, pp. 2223-2234 vol. 3.

Ashish Jain, Marco Gruteser, Mike Neufeld, Dirk Gunwald, "Benefits of Packet Aggregation in Ad-Hoc Wireless Network," Technical Report CU-CS-960-03, Department of Computer Science, University of colorado Aug. 2003.

International Search Report and Written Opinion—PCT/US2006/040711, International Search Authority—European Patent Office—Mar. 4, 2007.

Benveniste M., "Short presentation on the CCC protocol for mesh MAC",IEEE 802.11—05/0707r0,IEEE mentor, Jul. 20, 2005.

Choudhury, R., et al., "Using Directional Antennas for Medium Access Control in Ad Hoc Networks," Proceedings of ACM MOBICOM '02, Atlanta, Georgia, USA, Sep. 23-28, 2002, pp. 1-12.

Fujiwara A., et al., "EDCA Parameter Optimization for Throughput Improvement in Layer-2 Mesh Networks," Technical Report of The Institute of Electronics, Information and Communication Engineers, RCS, Wireless Communication System, Jul. 1, 2005.

Guerin R et al.,"Quality-of-Service in Packet Networks: Basic Mechanisms and Directions", Computer Networks ,31 (1999), pp. 169-189.

Jun J, et al, "The nominal capacity of wireless mesh networks," IEEE Personal Communications, Oct. 1, 2003, vol. 10, No. 5, pp. 8-14.

\* cited by examiner

METHOD AND APPARATUS FOR MANAGING DATA FLOW THROUGH A MESH NETWORK

CLAIM OF PRIORITY UNDER 35 U.S.C. §119

The present Application for Patent claims priority to Provisional Application No. 60/727,642 filed Oct. 17, 2005, and assigned to the assignee hereof and hereby expressly incorporated by reference herein.

BACKGROUND

1. Field

The disclosure relates to mesh networks. More particularly, the disclosure relates to a method and apparatus for managing data flow through a mesh network.

2. Background

In recent years there has been an increase in demand for ubiquitous access to high speed data services. The telecommunication industry has responded to the increase in demand by offering a variety of wireless products and services. In an effort to make these products and services interoperable, the Institute for Electrical and Electronics Engineers (IEEE) has promulgated a set of wireless local area network (WLAN) standards, e.g., IEEE 802.11. The products and services that conform to these standards are frequently networked in a wireless point to multipoint configuration. In this configuration, individual wireless devices (e.g., stations) communicate directly with an internet access point. Each of the wireless devices shares the available bandwidth.

A more efficient and resilient network can be realized through the use of a mesh network. A mesh network is a distributed network having multiple wireless mesh points. Each mesh point in the mesh network may act as a repeater receiving traffic, transmit or transport streams (TSs) and relaying the TSs to the next mesh point. A TS proceeds from an originating mesh point to a destination mesh point by "hopping" from mesh point to mesh point. TS routing algorithms ensure that TSs are routed efficiently from the origination mesh point to the destination mesh point. TS routing algorithms may dynamically adapt to changes in the mesh network and make the mesh network more efficient and resilient. For example, in the event a mesh point is too busy to handle the TS or a mesh point has dropped out of the mesh network, the TS routing algorithm may route the TS to the destination mesh point through other mesh points.

The destination mesh point is frequently a mesh portal. TSs arriving at the portal may be decoded and reformatted for retransmission over other networks, for example, the Internet. A TS originating at a mesh point and traveling toward the mesh portal is referred to as an upstream TS. A TS coming from a mesh portal and traveling toward a destination mesh point is referred to as a downstream TS. A mesh point that is a single hop away from a mesh portal is said to be a mesh point of rank 1. A mesh point that requires at least two hops to reach a mesh portal is said to be a mesh point of rank 2. In general, a mesh point that requires n hops to reach a mesh portal is said to be a mesh point of rank n.

Large percentages of a mesh network's traffic flows are upstream and downstream TSs. Upstream TSs generally hop from higher ranked mesh points to lower ranked mesh points before departing through a web portal. Downstream TSs generally hop from lower ranked mesh points to higher ranked mesh points. Thus, lower rank mesh points support the traffic flows of higher rank mesh points resulting in more TS congestion around the lower rank mesh points. In general, mesh points of rank 1 are likely to support more upstream and downstream TS than mesh points of rank 2. Similarly, mesh points of rank 2 are likely to support more TS than mesh points of higher ranks (e.g., 3, 4, etc.).

The mesh network topography, in which lower rank mesh points support upstream and downstream traffic flows from higher rank mesh points, often results in TS flow congestion at mesh points near the web portals. Many factors contribute to flow congestion including: neighboring mesh points attempting to access the communication channel medium too frequently; neighboring mesh points transmitting at lower data rates than optimum at the physical access layer; neighboring mesh points transmitting bursts that occasionally exceed the negotiated access throughput; poor radio conditions between the downstream mesh point and the upstream mesh point resulting in a lower than expected throughput.

It has been recognized by those skilled in the art that apparatuses and methods for reducing mesh congestion and improving data handling at individual mesh points can improve the efficiency and reliability of a mesh network.

SUMMARY

TS may be individually managed by each mesh point. Before receiving a TS, a mesh point receives an admission request having a traffic specification (TSPEC). The mesh point may determine whether there is adequate capacity to admit the TS and accept or deny the admission request. If the admission request is accepted, the mesh point may aggregate data from the TS with data from other TSs. The mesh point may broadcast a request to send messages containing an ordered response sequence. Receiving mesh points may respond in sequence with a clear to send. The mesh point may send the data packets to the receiving mesh points. The receiving mesh point may acknowledge receipt of a block of data packets with a data block acknowledge message depending on the acknowledgement policy dictated during the TS setup. The mesh point may have a power save mode to conserve energy. The mesh point may also select transmit channels to balance mesh loads or to increase mesh throughput.

A method for managing traffic streams (TS) at a mesh point in a mesh network. The method may comprise receiving a data packet, placing data from the data packet in one or more packet queues, aggregating data from the one or more packet queues into a transmit data packet and transmitting the transmit data packet during a transmission opportunity duration.

BRIEF DESCRIPTION OF THE DRAWINGS

The features, objects, and advantages of the disclosure will become more apparent from the detailed description set forth below when taken in conjunction with the drawings, wherein.

DETAILED DESCRIPTION

Methods and systems that implement the aspects of the various features of the disclosure will now be described with reference to the drawings. The drawings and the associated descriptions are provided to illustrate aspects of the disclosure and not to limit the scope of the disclosure. Reference in the specification to "one aspect" or "an aspect" is intended to indicate that a particular feature, structure, or characteristic described in connection with the aspect is included in at least an aspect of the disclosure. The appearances of the phrase "in one embodiment" or "an aspect" in various places in the specification are not necessarily all referring to the same aspect. Throughout the drawings, reference numbers are re-used to indicate correspondence between referenced elements. In addition, the first digit of each reference number indicates the figure in which the element first appears.

Figure 1:
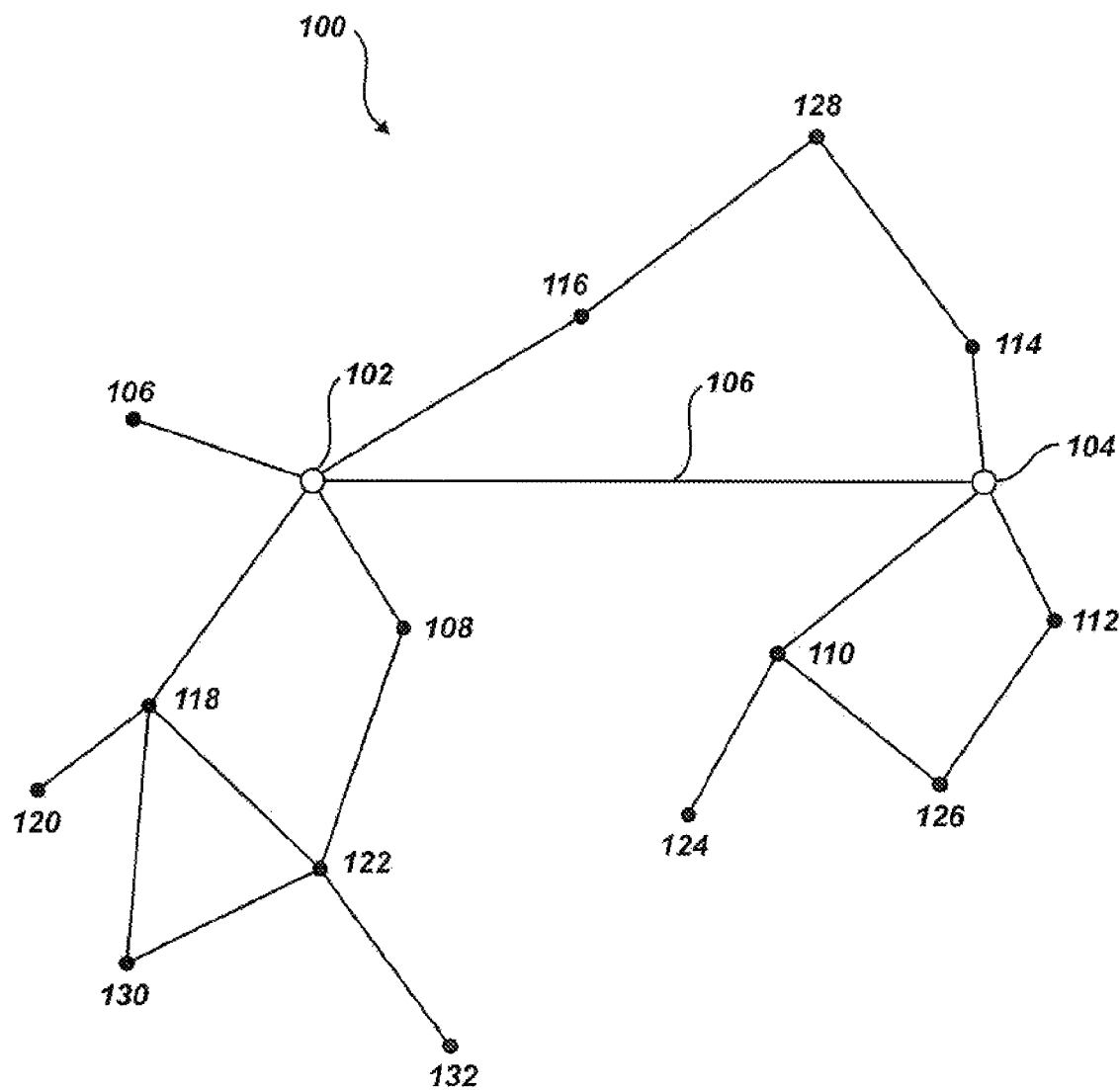
FIG. 1 is a mesh network according to an aspect.

FIG. 1 shows an exemplary mesh network 100 according to an aspect. The mesh network 100 may include one or more mesh portals, such as mesh points 102 and 104. Mesh portals are mesh points connected to a wired network, for example, the Internet 106. Mesh portals may serve as gateways between a wired network and a wireless mesh network. Since mesh portals form gateways in and out of the mesh network 100, they are said to be mesh points having rank 0.

The mesh network 100 may also have mesh points that are not mesh portals but are capable of communicating directly with one or more mesh portals, for example, mesh points 106, 108, 110, 112, 114, 116 and 118. These mesh points have rank 1 because it takes one hop for a TS at these mesh points to reach a mesh portal, such as mesh points 102 and 104. Some mesh points, for example, mesh points 120, 122, 124, 126, 128 and 130 may not be capable of communicating directly with the mesh portals 102 and 104 but rather communicate with the mesh portals 102 and 104 through another mesh point. These mesh points have rank 2 because it takes at least two hops for a TS at these mesh points to reach a mesh portal, such as mesh points 102 and 104. A TS originating at mesh point 120 may make a first hop to mesh point 108 or mesh point 118 before hopping to mesh point 102, a mesh portal. Other mesh points may not be capable of communicating with a mesh portal 102 or 104 in less than two hops, for example, mesh point 132. A TS originating at mesh point 132 may make a first hop to mesh point 122 before hoping to mesh point 108 or mesh point 118 before hopping to mesh portal 102. Mesh point 132 has rank 3 because it takes at least three hops to reach a mesh portal, such as mesh points 102 and 104. In general, the rank of any mesh point can be determined by calculating the minimum number of hops for a TS originating at the mesh point to reach a mesh portal.

TSs bound for mesh points of lower rank are said to be upstream traffic flows. TSs bound for mesh points of higher rank are said to be downstream traffic flows. Thus, TSs bound for the mesh portals, for example mesh points 102 and 104, are upstream traffic flows and TSs entering the mesh network 100 at the mesh portals, for example mesh points 102 and 104, are downstream traffic flows. Since much of the traffic in the mesh network 100 is likely to be arriving and departing the mesh network 100 at mesh points 102 and 104, there is an increased likelihood of TS congestion around mesh portals 102 and 104 and other mesh points of low rank.

Figure 2:
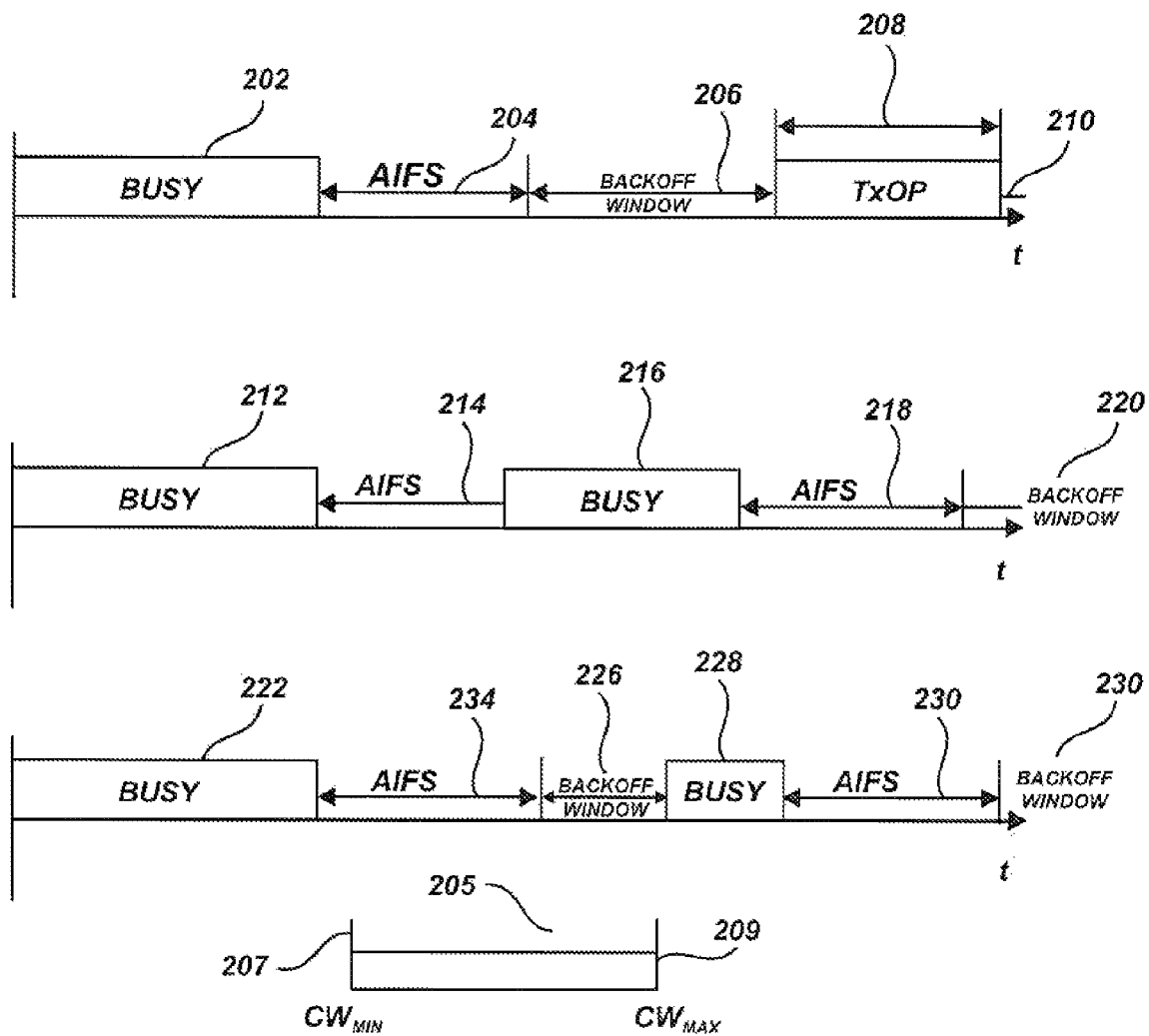
FIG. 2 shows timing diagrams illustrating contention access at an exemplary mesh point of FIG. 1 according to an aspect.

FIG. 2 shows timing diagrams illustrating contention access at an exemplary mesh point of FIG. 1 according to an aspect. Access to the communication channel may be controlled by assigning mesh points channel at least one access parameter that may include a transmission opportunity (TxOP) duration, a contention window minimum ($CW_{min}$), a contention window maximum ($CW_{max}$) and an arbitration inter-frame space (AIFS) time. Mesh points that transmit over the communication channel may contend for access to the communication channel.

Each of the mesh points may monitor the communication channel and when the communication channel becomes available the transmitting mesh points may idle for a wait time equal to their respective assigned AIFS time. During the AIFS time, the idling mesh points may continue to monitor the communication channel and if the communication channel becomes busy, the mesh points may continue to idle and wait until the communication channel becomes available and then wait another time period equal to their respective assigned AIFS time. When the communication channel has been available for a time period equal to its AIFS time, the mesh points may set a backoff timer. The length of time set on the backoff timer is random. The length of time set on the backoff timer is determined by a number drawn from a uniform distribution between the assigned $CW_{min}$ and $CW_{max}$.

Three possible outcomes of contention access for an individual mesh point are shown on the three timelines of FIG. 2. The first timeline shows a mesh point successfully contending for access when the communication channel becomes available. The timeline begins with the mesh point monitoring a busy 202 communication channel. While the communication channel is busy 202, the mesh point's transmitter idles. When the channel becomes available the mesh point's transmitter continues to idle for a time period equal to its AIFS time 204. While idling, the mesh point continues to monitor the communication channel. At the end of the AIFS time 204, the mesh point may randomly select a backoff slot by selecting a number from a uniform distribution 205 with a minimum value $CW_{min}$ 207 and a maximum value $CW_{max}$ 209. This selected number is multiplied with the standard defined slot-time (e.g., slot time may be about 9 microseconds) and the result is called the backoff time. The backoff time defines the length of the backoff window 206. The mesh point's transmitter continues to idle and monitor the communication channel until the backoff timer determines that the length of time equal to the backoff window 206 has expired. At the end of the backoff window 206, the mesh point's transmitter has a TxOP 208 during which the mesh point may transmit information to the receiving mesh point. At the end of the TxOP 208, the mesh point's transmitter idles once again and begins to wait the AIFS time, beginning the contention access process once again.

The second timeline shows another possible outcome of contention access. The outcome may occur when another station begins transmitting during the AIFS time. The timeline may begin with the mesh point monitoring a busy 212 communication channel. When the communication channel becomes available, the mesh point's transmitter may idle and the mesh point may begin to wait a time equal to the AIFS time 214. During the AIFS time 214, another mesh point with a shorter AIFS time may begin transmitting and the communication channel may become busy 216 once again. The mesh point's transmitter may continue to idle with the mesh point waiting for the communication channel to become available again. When the communication channel becomes available, the mesh point may wait another AIFS time 218 before selecting a backoff time defined by a backoff window 220 and starting the backoff window counter.

The third timeline shows another possible outcome of contention access. The outcome may occur when another station interrupts during the mesh point's backoff window. The timeline may begin with the mesh point monitoring the communication channel while the communication channel is busy 222. The mesh point's transmitter may idle during this time. When the communication channel becomes available, the mesh point's transmitter may continue to idle for a time period equal to the AIFS time 224. While idling, the mesh point may continue to monitor the communication channel. At the end of the AIFS time 224, the mesh point may randomly selects a backoff time by selecting a time from a uniform distribution 205 with a minimum time $CW_{min}$ 207 and a maximum time $CW_{max}$ 209. The mesh point's transmitter may continue to idle until the back off timer counts a length of time equal to the backoff window 226. While idling, the mesh point may continue to monitor the communication channel. While the backoff counter is counting, another mesh point may begin transmitting and the communication channel may become busy 228. The backoff counter may be stopped. When the communication channel becomes available, the mesh point's transmitter may continue to idle and wait a time period equal to the AIFS time 230. At the end of the AIFS time 230, the backoff counter may begin counting again from the time that it was stopped.

The transmit frequency and the transmit data rate of a mesh point may be controlled by adjusting the TxOP duration, $CW_{min}$, $CW_{max}$ and AIFS time. A large TxOP duration allows a mesh point to transmit a large amount of data each time the mesh point accesses the receiving mesh point resulting in a large data rate. A small AIFS time relative to neighboring mesh points contending for access to the communication channel increases the probability of access, resulting in a large number of medium access (and hence more TxOPs assuming that the TxOP is constant for each access) and a large data rate. Similarly, a small $CW_{min}$ and $CW_{max}$ relative to neighboring mesh points increases the probability of selecting a small backoff time and increasing the probability of access to the receiving mesh point resulting in a large number of TxOPs and a large data rate. Analogously, a small TxOP, a large AIFS time, or a large $CW_{min}$, and $CW_{max}$ may result in a low data rate.

Quality of Service (QoS) may also be adjusted by controlling the transmit frequency through the access parameters TxOP, $CW_{min}$, $CW_{max}$ and AIFS time. To decrease TS delays, the $CW_{min}$, $CW_{max}$ or AIFS time may be decreased, increasing the probability of successfully accessing the receiving mesh point. To compensate for more frequent access, the TxOP duration may be decreased to free up channel capacity for other mesh points. Decreasing TS delay by increasing successful medium access may come at a cost. Each medium access may have medium access control (MAC) overhead. MAC overhead consumes communication channel bandwidth that may otherwise be available for TSs.

In the mesh network 100, at least one access parameter may be assigned based on rank, amount of traffic carried, and available rate. Lower rank mesh points may carry more traffic and may be assigned lower AIFS, $CW_{min}$, $CW_{max}$ values as well as larger TxOP durations. A descriptor may be provided with TSs that identifies the average bit rate of the TS and the peak bit rate of the TS. Access parameters may be adjusted to accommodate the average bit rate and the peak bit rate of the TS. The available bit rate between two mesh points at the physical layer may also be used to tune the access parameters. Access parameters may also be adjusted as new flows and mesh points are added to the mesh network 100.

In another aspect, at least one access parameter may be adjusted based on the rank of the mesh points. The mesh portals may then broadcast these access parameters to neighboring mesh points which in turn broadcast them to their neighboring mesh points until all mesh points have their respective access parameters. Alternatively, the access parameters may be preset by a vendor.

Figure 3:
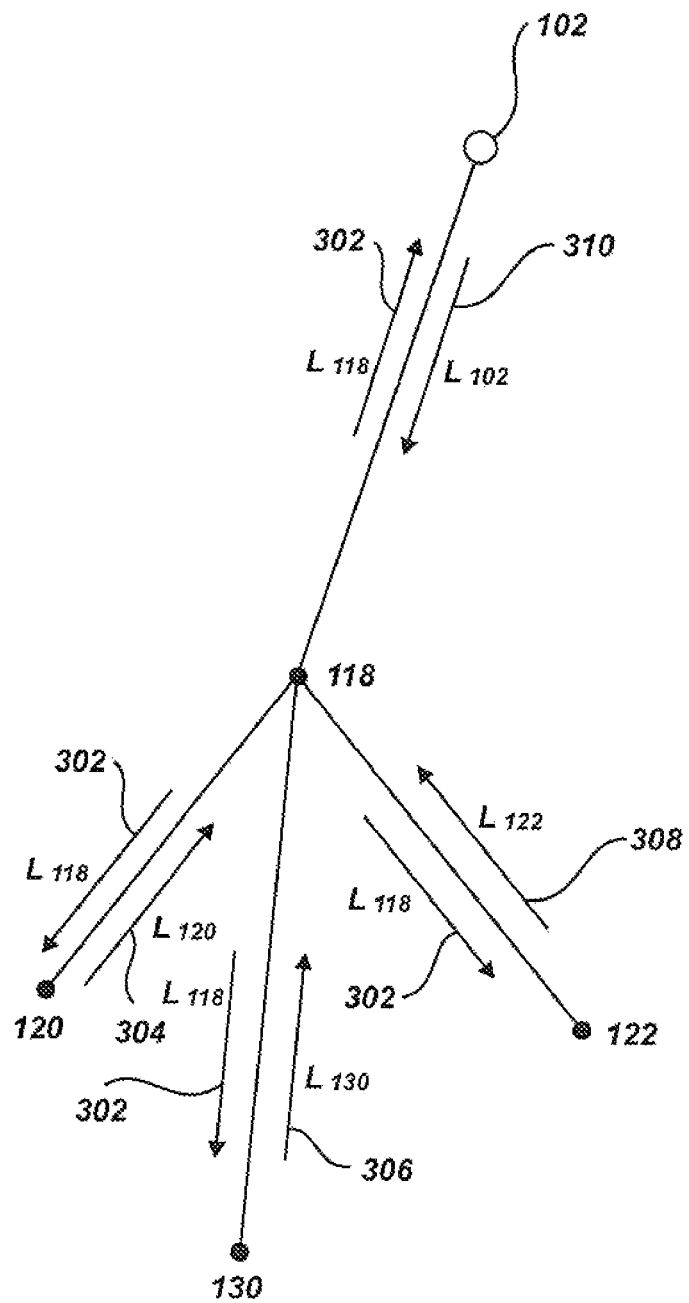
FIG. 3 shows a portion of the mesh network of FIG. 1 illustrating access control at an exemplary mesh point according to an aspect.

FIG. 3 shows a portion of the mesh network 100 of FIG. 1 illustrating access control at an exemplary mesh point according to an aspect. Admission control of a TS to a mesh point may be performed by each of the mesh points in the mesh network 100. Each mesh point in the mesh network 100 may broadcast load information in its beacon. For example, mesh point 118 may broadcast its load information $L_{118}$ 302, mesh point 120 may broadcast its load information $L_{120}$ 304, mesh point 130 may broadcast its load information $L_{130}$ 306, mesh point 122 may broadcast its load information $L_{122}$ 308, and mesh point 102 broadcast its load information $L_{102}$ 310.

The load information may be used by each of the mesh points for admission control of new TS. For example, mesh point 120 may use $L_{118}$ 302 to determine whether mesh point 118 may be able to accommodate a new TS. If mesh point 120 determines that mesh point 102 may be able to handle the new TS, it may send an admission request to mesh point 118. Mesh point 118 may determine if there are adequate idle periods in its neighborhood to accommodate a TxOP for the new TS and if so admit the new TS. Otherwise, mesh point 118 may deny the admission request.

Admission control may be controlled by each mesh point in the mesh network 100. Downstream mesh points may negotiate with upstream mesh points for TxOPs for upstream TSs. Upstream mesh points may negotiate with downstream mesh points for TxOPs for downstream TSs. Alternatively, a downstream mesh point may negotiate a TxOPs for both upstream and downstream TSs reserving a large enough TxOP to accommodate the upstream TSs and the downstream TSs.

Figure 4:
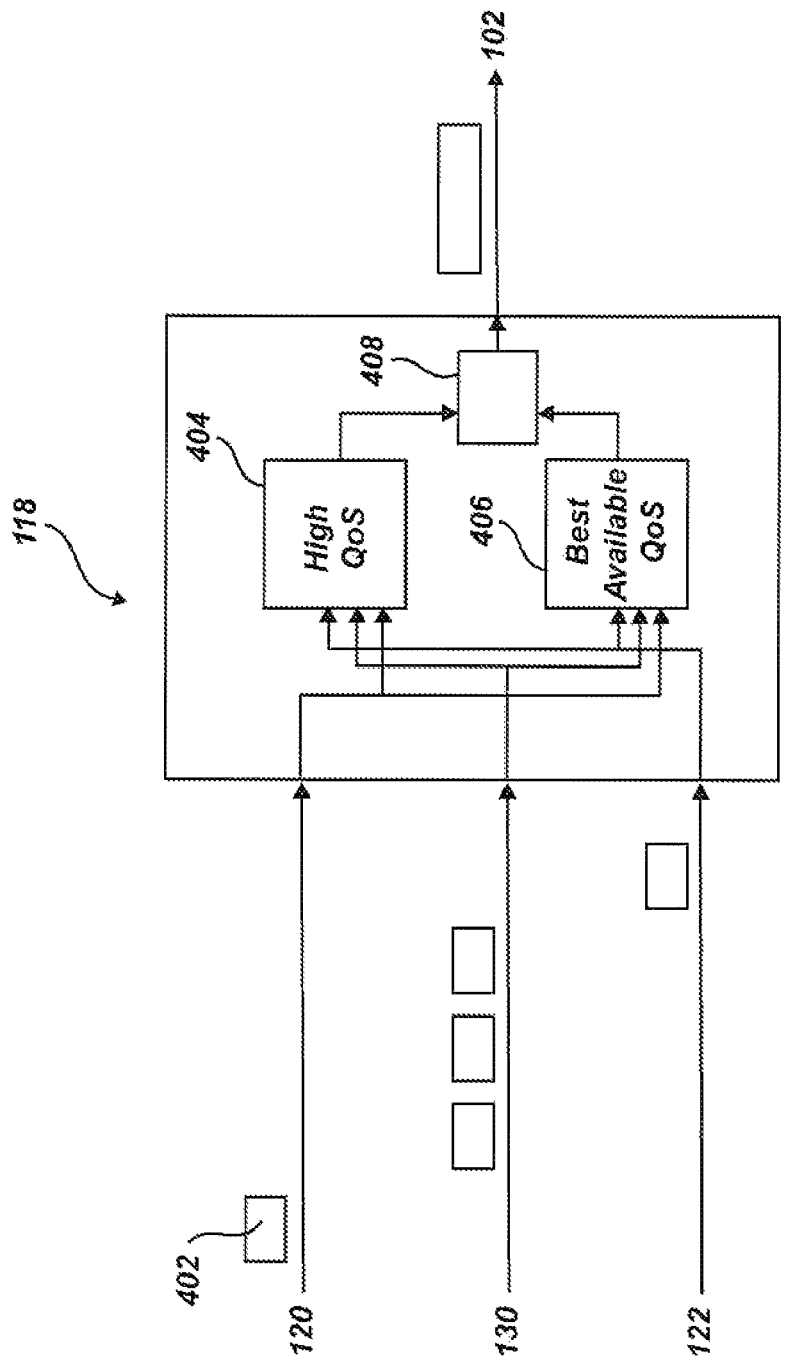
FIG. 4 is a block diagram showing data aggregation at an exemplary mesh point in the mesh network of FIG. 1 according to an aspect.

FIG. 4 is a block diagram showing data aggregation at an exemplary mesh point 118 in the mesh network 100 of FIG. 1 according to an aspect. Data packets 402 arriving from mesh points 120, 130 and 122 may be parsed by mesh point 118 into two or more QoS data types. The data may be parsed into a high QoS and a best available QoS and stored in respective packet queues or locations 404 and 406. Data from arriving data packets 402 may be aggregated in the QoS packet queues 404 and 406. A data packet generator 408 may generate data packets using the data in packet queues 404 and 406 with priority given to the high QoS data stored in packet queue 404. The data packet transmitter 408 may forward the packets to one or more mesh points. In this example, the data packet transmitter 408 may forward the data packet to mesh point 102.

Aggregation of data packets allows more efficient use of the communication medium. The aggregate size should be large enough that many bits may be transmitted for each medium access reducing the required medium access frequency and the associated overhead thereof. The aggregate size may also be small enough that the aggregation delay does not adversely impact the negotiated QoS by incurring an unacceptable TS latency.

Thus, TS flow control may be performed at any mesh point in the mesh network through access control, the assignment of contention access parameters, and the use of QoS identifiers. The application of backpressure may extend from low rank to high rank mesh points. The backpressure may be applied as explained herein and a mesh point may use an explicit backpressure message directed at a particular mesh point or broadcast backpressure message. The mesh point may command another mesh point to adjust its throughput or its medium access frequency. A backpressure message may be piggybacked or aggregated with other data packets.

Acknowledgment of receipt of a data packet 402 may be performed using a block acknowledge. When a data block of predetermined length of a particular QoS is received, the mesh point may send a block acknowledge to the transmitting mesh point. For example, mesh point 118 may send block acknowledge messages to mesh points 120, 122 and 130. Packet sequencing may also be performed at the mesh point. For example, mesh point 118 may assign new sequence numbers when data packets are aggregated in the data packet generator 408. The mesh point 118 may hold data packet blocks before forwarding until a complete data packet block is received and any dropped packet from the data packet block is recovered. In this way, data packets being forwarded in the mesh network 100 may be held at each mesh point hop until the complete data packet block is received.

Figure 5:
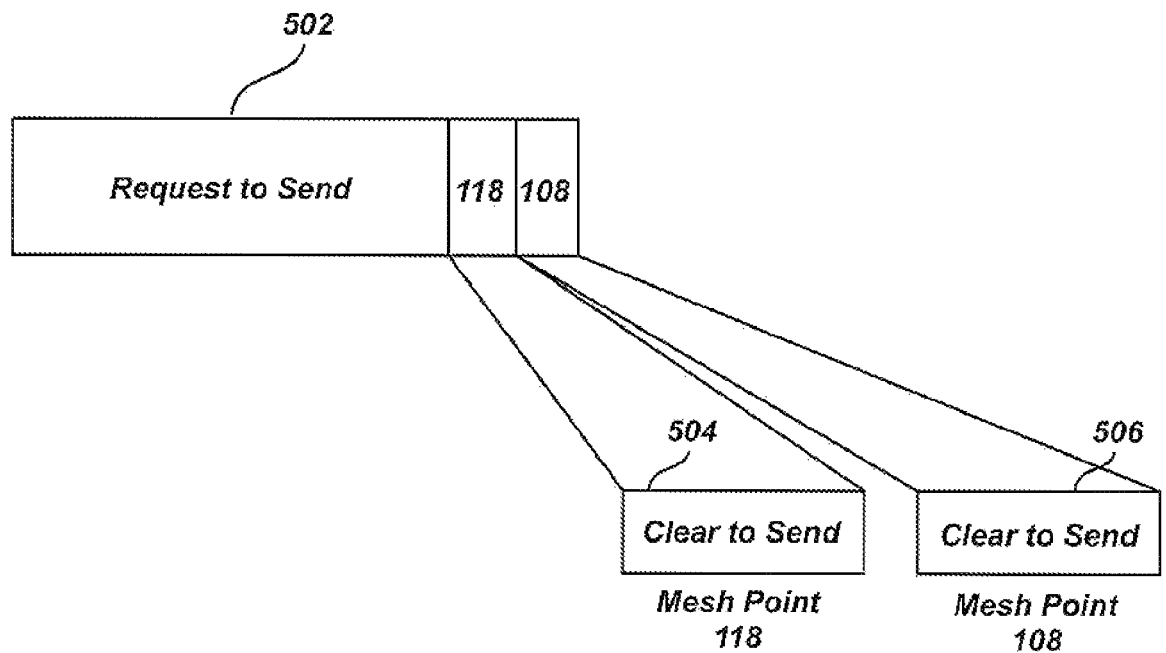
FIG. 5 is a block diagram showing an MRTS and MCTS message structure of the mesh network of FIG. 1 according to an aspect.

FIG. 5 shows an exemplary timeline of an M-Request-to-Send (MRTS) message 502 from mesh point 122 to mesh points 118 and 108 followed by M-Clear-To-Send (MCTS) messages 504 and 506 from mesh points 118 and 108, respectively, responding to the MRTS. TS collisions in the mesh network 100 may be minimized by having a transmitting mesh point transmit an RTS message with each potential receiving mesh point respond with a CTS message. Traffic collisions of CTS responses may be minimized by the use of the M extension to the RTS and CTS messages. For example, mesh points 122 may broadcast an RTS message with an M extension that identifies mesh points 118 and 108 and the order in which they should respond to the MCTS message. Mesh points 118 and 108 may respond with an MCTS in the order specified in the MRTS message. The responses may be a broadcast (omni-directional) message or the response may be a directed. A directed message may be steered using beamsteering or multiple input multiple output (MIMO) transmission.

The RTS and CTS transmit handshake along with the data block acknowledge may be used to protect data transmissions over the medium. Once a RTS and CTS handshake occurs, other mesh points in the neighborhood may hold off on transmissions that may interfere with links being established between the transmitting mesh point, e.g., mesh point 122, and the receiving mesh point(s), e.g., mesh points 108 and 118. This decreases the probability of collisions due to a hidden mesh point that may be transmitting, but due to shadowing or environmental conditions, may not be heard by mesh point 122. The RTS and CTS transmit handshake with a block acknowledges may also be implemented in an MRTS and MCTS message structure.

After transmitting data blocks to a receiving mesh point, the transmitting mesh point, e.g., mesh point 122, may make a reverse direction grant allowing the receiving mesh point(s), e.g., mesh points 108 and 118, to transmit downstream TSs. The reverse direction grant is not necessarily a new TxOP but may be a portion of the TxOP already reserved for the original transmitting mesh point.

After a successful medium access is negotiated through an RTS/CTS or MRTS/MCTS handshake, the transmitting mesh point may transmit data during the TxOP duration. If all the data is transmitted, the transmitting mesh point may reset its access parameters. TS flow control may be exploited through buffers such as the high QoS packet queue 404 and the best available QoS packet queue 406. One methodology of controlling flow rate may be to set the schedule service interval to one quarter of the total allowable hop delay interval for the TS.

Figure 6:
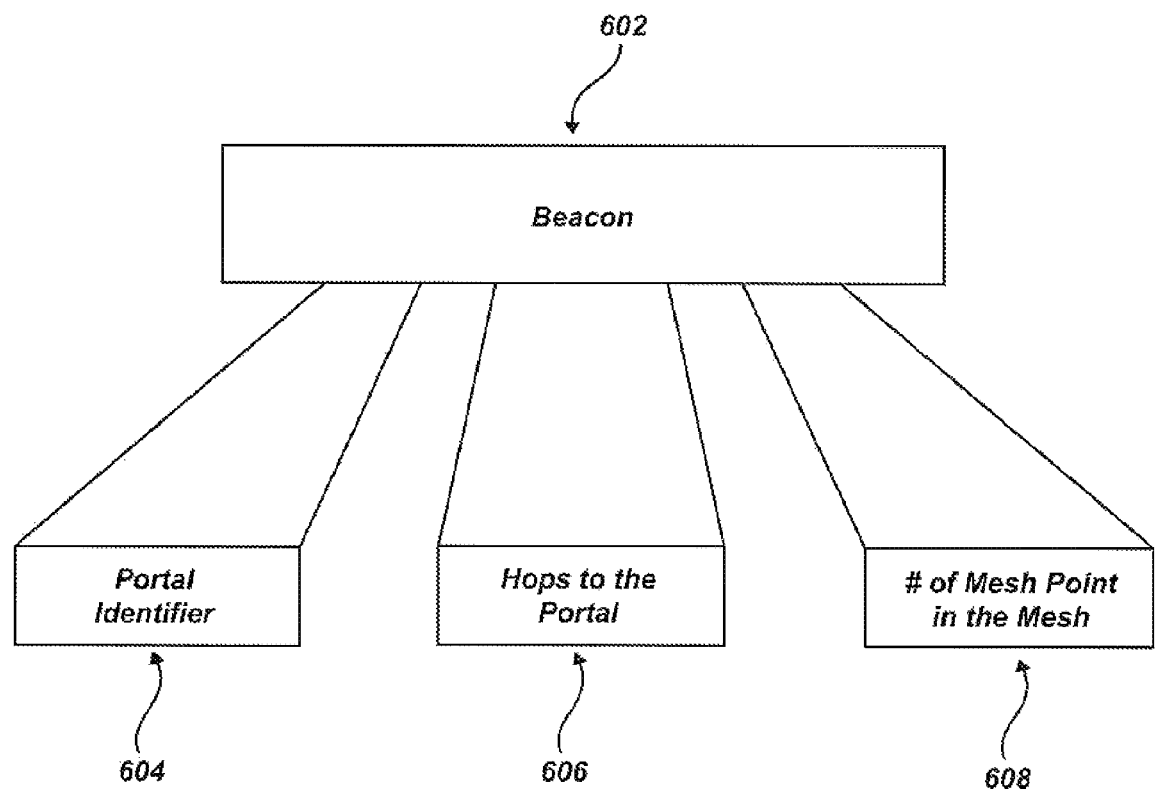
FIG. 6 is a block diagram showing an exemplary beacon message transmitted from a mesh point in FIG. 1 according to an aspect.

FIG. 6 is a block diagram showing an exemplary beacon message 602 transmitted from a mesh point according to an aspect. The beacon message may include a mesh portal identifier 604, the number of hops to the mesh portal 606, and the number of mesh points in the mesh network 608. The mesh network 100 may have more than one mesh, if some of the mesh points have more than a single channel operating capability. In this case the beacon messages 602 may be used by each of the mesh points to select channels for its TS.

Each mesh point may monitor the beacons of the mesh points in its neighborhood to determine which channel to use. The mesh point may select the channel based on the data rate achievable on the channel using the measured beacon signal strength as a metric. The mesh point may also attempt to equalize the load on the mesh network 100 by choosing the least crowded channel.

Figure 7:
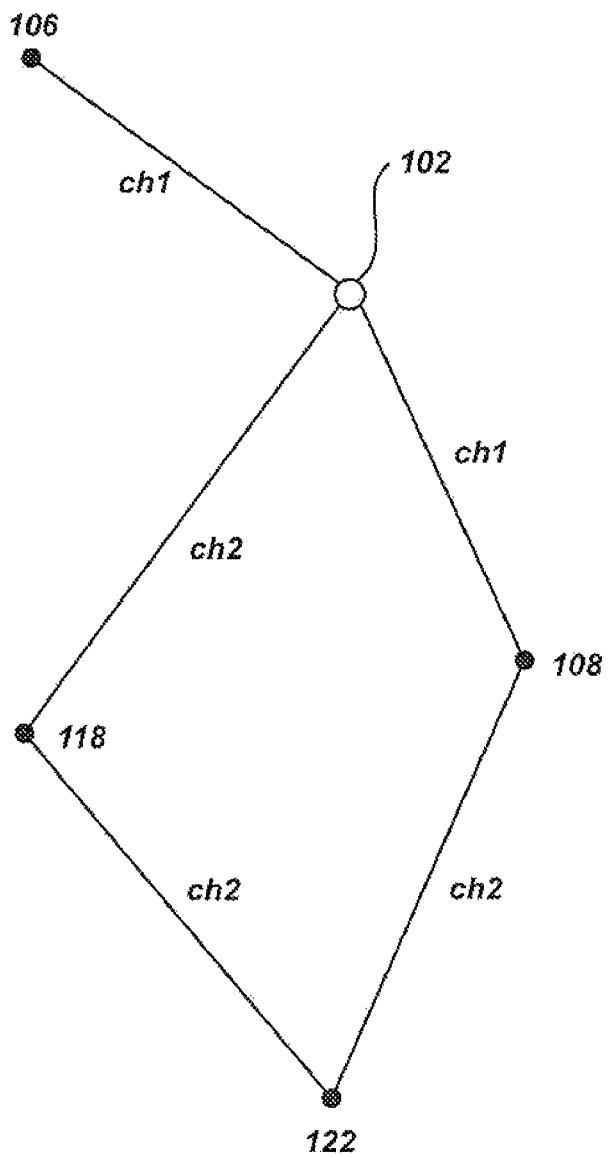
FIG. 7 is a diagram of a portion of the mesh network of FIG. 1 including two meshes with two separate channels according to an aspect.

FIG. 7 shows the mesh network 100 of FIG. 1 where mesh point 102, a mesh portal, may operate on more than one channel. Thus two or more meshes may exist concurrently. Mesh portal 102 may broadcast its beacon 602 on channels 1 and 2. Neighboring mesh points 106, 108 and 118 may monitor beacons 1 and 2. The neighboring mesh points 106, 108 and 118 may select a channel based on the strength of the received beacon on each channel or to balance the load. Mesh points 106 and 108 may choose channel 1 while mesh point 118 may choose channel 2. Each of these rank 1 mesh points may broadcast its own beacon.

Mesh point 122 in turn may monitor the beacon of its neighboring mesh points 108 and 118. If mesh point 118 has only a single channel capability, mesh point 122 may communicate with mesh point 118 over the channel 2 mesh. If mesh point 108 has dual channel capability, mesh point 122 may choose to communicate with mesh point 108 over the channel 2 mesh. The TSs received by mesh point 108 may be received on the channel 2 mesh and forwarded to mesh point 102 over the channel 1 mesh.

Mesh points may periodically monitor channels they are not using and switch channels to improve throughput. This dynamic load balancing may be done infrequently to minimize disruption of communication.

Occasionally, a mesh point may be using a channel that may be inadequate for the TS traffic flow. The mesh point may scan for other beacons and determine their loads. If an appropriate alternate channel is found, the mesh point may broadcast a change channel message to its child mesh points (TS providing mesh points). The child mesh points in turn may broadcast the change channel request to any of its child mesh points. For example, mesh point 108 may have only a single channel capability and may choose to change channel from channel 1 to channel 2. It may broadcast the change request to mesh point 122 its sole child mesh point. Mesh point 122 in turn may broadcast a change channel message to mesh point 130 (not shown) its sole child mesh point. Mesh point 108 may wait until the channel change is affected by its child mesh point before making the channel change. Likewise, mesh point 122 may wait until the channel change is affected before making the channel change.

A mesh point with only a single channel capability may also dissociate from another mesh point if a change channel request is received and the mesh point is unable to change channels because it is communicating with other mesh points over other channels and does not have the capability to add a channel. For example, if mesh point 118 broadcasts a change channel request (to change to channel 1), mesh point 122 may dissociate from mesh point 118 if it has only a single channel capability.

Mesh points may be battery operated or have limited power. These mesh points may have a power save mode. The power save mode may include a period where the mesh point "sleeps" and does not transmit or receive information. The mesh point may broadcast the sleep time and duration of in its beacon. Mesh points monitoring the beacon may use this information in computing radio metrics for routing.

A sleeping mesh point may send triggers when its sleep time ends. Mesh points may transmit buffered data packets to the awakened mesh point. The routing algorithms may account for the increased delay time due to sleeping mesh points. If alternate routes are available, the routing algorithms may route TS around mesh points having a power save mode.

Figure 8:
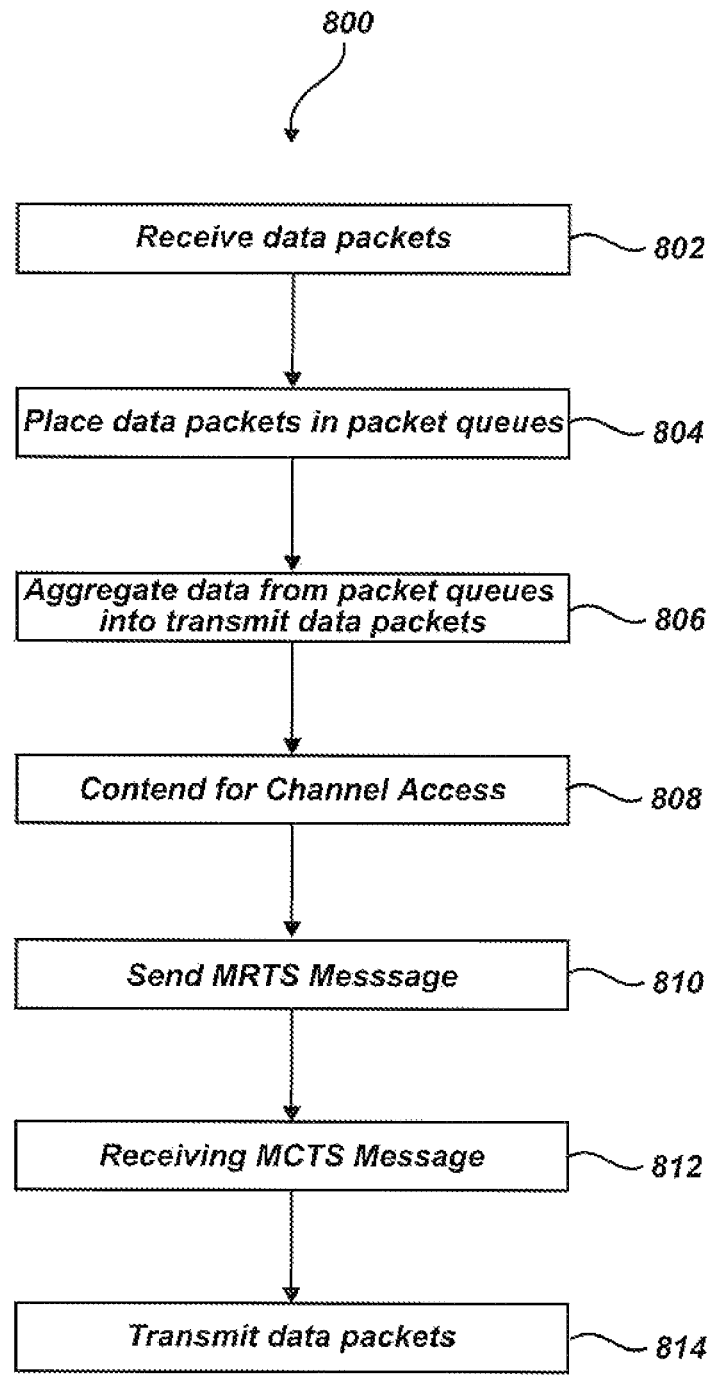
FIG. 8 is a flow diagram of a method of TS management at an exemplary mesh point according to an aspect.

FIG. 8 is a flow diagram of a method of TS management 800 at an exemplary mesh point according to an aspect. The mesh point may receive data packets transmitted from one or more mesh points (802). The mesh point may parse the data packets and sort the data in the data packets by QoS. The mesh point may place the data in one or more packet queues (804). Each of the packet queues may store data that correspond to a particular QoS. The QoS packet queues may be high priority or best available, for example. The packet queues may serve as a leaky bucket police storing and buffering data to control the mesh point outflow data rate. The mesh point may aggregate data from one or more packet queues into transmit data packets (806).

The mesh point may contend for access to the communication channel (808). The mesh point may adjust its contention access parameters such as the AIFS time, $CW_{min}$, $CW_{max}$, and TxOP duration in response to a command from another mesh point. After successfully accessing the communication channel, the mesh point may send an MRTS message (810). The M portion of the message may have an ordered list of the response order expected from neighboring mesh points. The mesh point may receive an MCTS from one or more of the neighboring mesh points (812). The mesh point may transmit one or more data packets during its TxOP duration (814). The mesh point may receive a block acknowledge in response.

Figure 9:
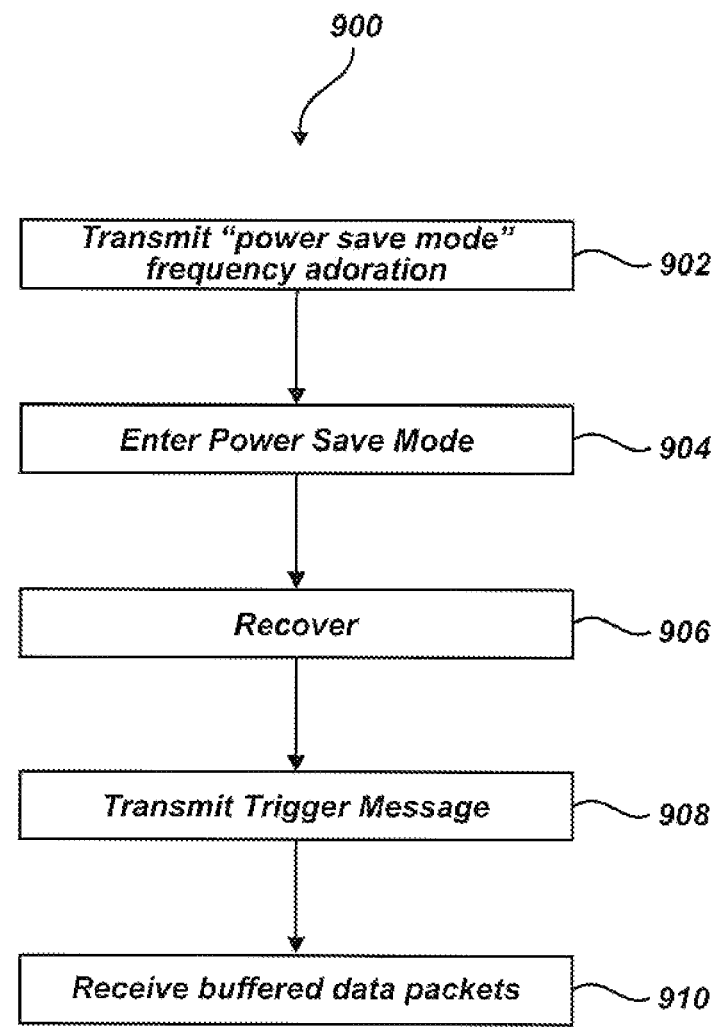
FIG. 9 is a flow diagram of a method of energy management at an exemplary mesh point according to an aspect.

FIG. 9 is a flow diagram of a method of energy conservation at an exemplary mesh point according to an aspect. The mesh point may transmit its power save mode frequency and duration in a beacon message (902). The mesh point may then enter the power save mode at a predetermined time (904). The power save mode may preclude transmitting and other functions that use a lot of energy. When a time equal to the power save duration has expired, the mesh point may recover (906). The awakening mesh point may transmit a trigger message to neighboring mesh points alerting the neighboring mesh points that they may now transmit to the mesh point (908). The mesh point may receive buffered data packets from the neighboring mesh points (910).

Figure 10:
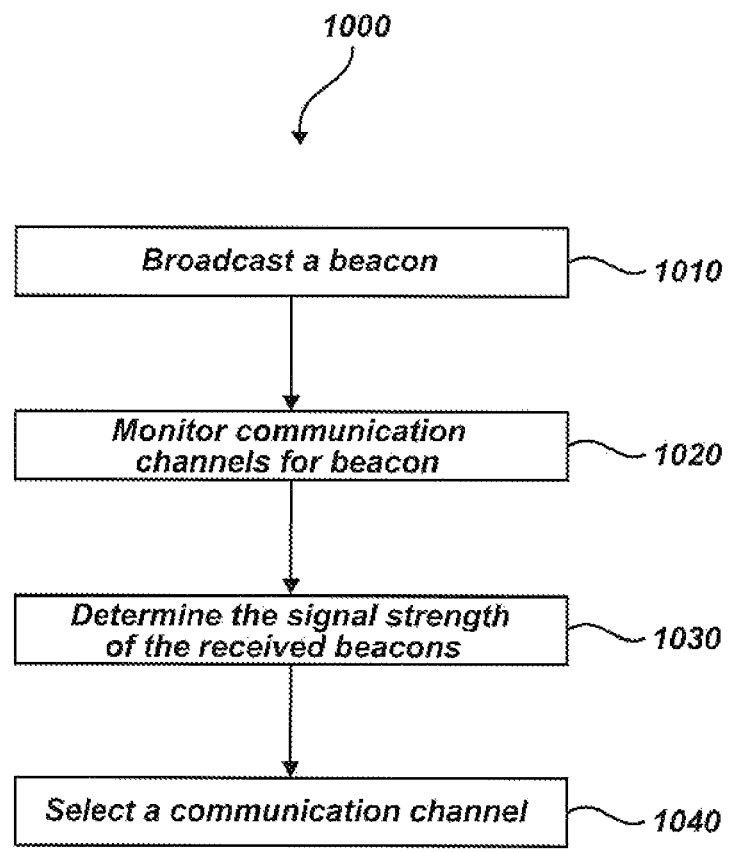
FIG. 10 is a flow diagram of a method of channel management at an exemplary mesh point according to an aspect.

FIG. 10 is a flow diagram of a method 1000 of selecting a channel in a multiple channel mesh network according to an aspect. Each mesh point may broadcast a beacon over each channel that it is operating on (1010). For example, a mesh point operating on two channels may transmit a first beacon over a first channel and a second beacon over a second channel. The mesh point may also monitor the communication channel for beacons (1020), which may include load information or other signal. The mesh point may determine the signal strength of each of the received beacons (1030). The beacon message may contain information about the mesh load on that channel. The mesh point may select a communication channel using the mesh load information, the signal strength information or other applicable information (1040). The mesh point may then transmit over the selected communication channel.

Figure 11:
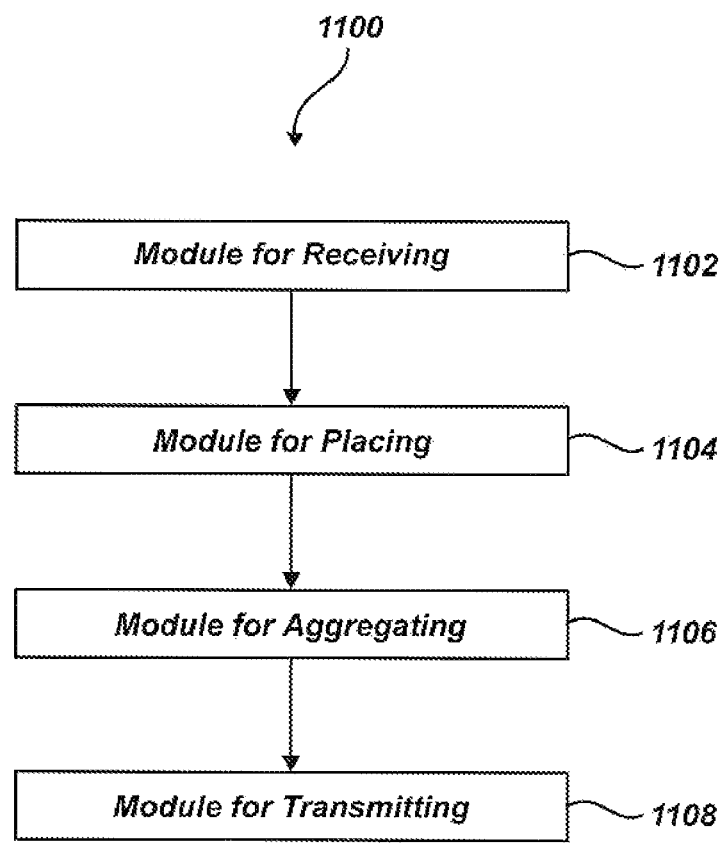
FIG. 11 is a block diagram illustrating exemplary components of an apparatus for managing traffic streams according to an aspect.

FIG. 11 is a block diagram illustrating exemplary components for the means for apparatus 1100 for managing traffic streams. One or more modules shown in FIG. 11 may be used as the components for the means for apparatus for managing traffic streams. The modules may be implemented using hardware, software or combinations thereof. One or more modules may be added or deleted depending on the configuration of the apparatus 1100. For example, the means may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, software modules or any combination thereof designed to perform the functions described herein.

The apparatus 1100 may include an optional module for receiving 1102 configured to receive a data packet, a module for storing 1104 configured to store data from the data packet into one or more packet queues, a module for aggregating 1106 configured to aggregate data from the one or more packet queues into a transmit data packet and a module for transmitting 1108 configured to transmit the transmit data packet during a transmission opportunity duration.

Figure 12:
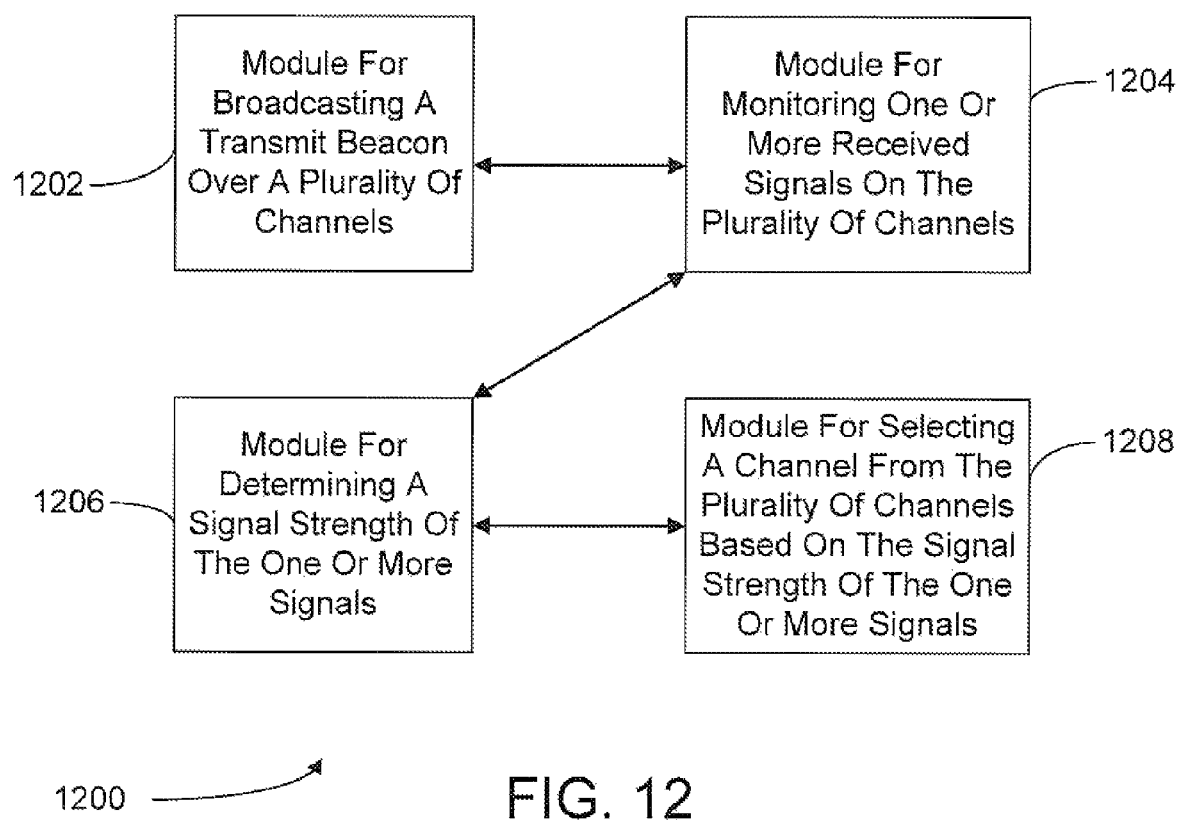
FIG. 12 is a block diagram illustrating exemplary components of an apparatus for TS management at an exemplary mesh point according to an aspect.

FIG. 12 is a block diagram illustrating exemplary components of an apparatus 1200 for TS management at an exemplary mesh point according to an aspect. One or more modules shown in FIG. 12 may be used as the components for the means for apparatus for managing traffic streams. The modules may be implemented using hardware, software or combinations thereof. One or more modules may be added or deleted depending on the configuration of the apparatus 1200. For example, the means may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, software modules or any combination thereof designed to perform the functions described herein.

Apparatus 1200 may include a module 1202 for broadcasting a transmit beacon over a plurality of channels, a module 1204 for monitoring one or more received signals, e.g. beacons or loads, on the plurality of channels, a module 1206 means for determining a signal strength of the one or more received signals, and a module 1208 for selecting a channel from the plurality of channels based on the signal strength of the one or more received beacons or loads.

Those skilled in the art will appreciate that the various illustrative logical blocks, modules, circuits, and algorithms described in connection with the aspects disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions, stored on a computer readable medium that is part of a computer program product, that may be read and/or executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

The disclosure may be embodied in other specific forms without departing from its spirit or essential characteristics. The described aspects are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A method for managing traffic streams at a mesh point in a mesh network comprising:
   receiving a first data packet from a first mesh point and a second data packet from a second mesh point via wireless transmissions, at least a portion of the data in the first data packet being first quality of service (QoS) type data and at least a portion of the data in the second data packet being first QoS type data;
   storing the first QoS type data from the first data packet and the second data packet in a packet queue associated with the first QoS type;
   selecting data for a transmit data packet from the packet queue associated with the first QoS type;
   aggregating the selected data into the transmit data packet, the aggregated transmit data packet including at least a portion of the first QoS type data from the first data packet and at least a portion of the first QoS type data from the second data packet;
   contending for access to a communications channel according to at least one access parameter, wherein the at least one access parameter is based on a rank of the mesh point; and
   transmitting the transmit data packet during a transmission opportunity duration.

2. The method of claim 1 wherein at least a portion of the data in the first data packet or the data in the second data packet is second QoS type data, and the storing comprises parsing the data into either the packet queue associated with the first QoS type or a second packet queue associated with a second QoS type.

3. The method of claim 1, wherein the at least one access parameter comprises an arbitration interframe space (AIFS) period, the method further comprising adjusting the AIFS period to control data flow rate.

4. The method of claim 1, wherein the at least one access parameter comprises an arbitration interframe space (AIFS) period, the method further comprising adjusting the AIFS period to control channel access frequency.

5. The method of claim 1, wherein the at least one access parameter comprises a contention access window, the method further comprising adjusting the contention access window to control data flow rate.

6. The method of claim 1, wherein the at least one access parameter comprises a contention access window, the method further comprising adjusting the contention access window to control channel access frequency.

7. The method of claim 1, wherein the at least one access parameter comprises the transmission opportunity duration, the method further comprising adjusting the transmission opportunity duration to control data flow rate.

8. The method of claim 1, wherein the at least one access parameter comprises the transmission opportunity duration, the method further comprising adjusting the transmission opportunity duration to control channel access frequency.

9. A non-transitory computer readable medium including:
instructions for receiving a first data packet from a first mesh point and a second data packet from a second mesh point via wireless transmissions, at least a portion of the data in the first data packet being first quality of service (QoS) type data and at least a portion of the data in the second data packet being first QoS type data;
instructions for storing the first QoS type data from the first data packet and the second data packet in a packet queue associated with the first QoS type;
instructions for selecting data for a transmit data packet from the packet queue associated with the first QoS type;
instructions for aggregating the selected data into the transmit data packet, the aggregated transmit data packet including at least a portion of the first QoS type data from the first data packet and at least a portion of the first QoS type data from the second data packet;
instructions for contending for access to a communications channel according to at least one access parameter, wherein the at least one access parameter is based on a rank of the mesh point; and
instructions for transmitting the transmit data packet during a transmission opportunity duration.

10. An apparatus for managing traffic streams at a mesh point in a mesh network comprising:
a receiving module configured to receive a first data packet from a first mesh point and a second data packet from a second mesh point via wireless transmissions, at least a portion of the data in the first data packet being first quality of service (QoS) type data and at least a portion of the data in the second data packet being first QoS type data;
a storing module configured to store the first QoS type data from the first data packet and the second data packet in a packet queue associated with the first QoS type;
a selecting module configured to select data for a transmit data packet from the packet queue associated with the first QoS type;
an aggregating module configured to aggregate the selected data into the transmit data packet, the aggregated transmit data packet including at least a portion of the first QoS type data from the first data packet and at least a portion of the first QoS type data from the second data packet;
a contending module configured to contend for access to a communications channel according to at least one access parameter, wherein the at least one access parameter is based on a rank of the mesh point; and
a transmitting module configured to transmit the transmit data packet during a transmission opportunity duration.

11. The apparatus of claim 10, wherein at least a portion of the data in the first data packet or the data in the second data packet is second QoS type data, and the storing module is further configured to parse the data into either the packet queue associated with the first QoS type or a second packet queue associated with a second packet type.

12. The apparatus of claim 10, wherein the at least one access parameter comprises an arbitration interframe space (AIFS) period, the apparatus further comprising an adjusting module configured to adjust the AIFS period to control data flow rate.

13. The apparatus of claim 10, wherein the at least one access parameter comprises an arbitration interframe space (AIFS) period, the apparatus further comprising an adjusting module configured to adjust the AIFS period to control channel access frequency.

14. The apparatus of claim 10, wherein the at least one access parameter comprises a contention access window, the apparatus further comprising an adjusting module configured to adjust the contention access window to control data flow rate.

15. The apparatus of claim 10, wherein the at least one access parameter comprises a contention access window, the apparatus further comprising an adjusting module configured to adjust the contention access window to control channel access frequency.

16. The apparatus of claim 10, wherein the at least one access parameter comprises the transmission opportunity duration, the apparatus further comprising an adjusting module configured to adjust the transmission opportunity duration to control data flow rate.

17. The apparatus of claim 10, wherein the at least one access parameter comprises the transmission opportunity duration, the apparatus further comprising an adjusting module configured to adjust the transmission opportunity duration to control channel access frequency.

18. The apparatus of claim 10 further comprising a receiving module configured to receive the data packets.

19. An apparatus for managing traffic streams at a mesh point in a mesh network comprising:
means for receiving a first data packet from a first mesh point and a second data packet from a second mesh point via wireless transmissions, at least a portion of the data in the first data packet being first quality of service (QoS) type data and at least a portion of the data in the second data packet being first QoS type data;
means for storing the first QoS type data from the first data packet and the second data packet in a packet queue associated with the first QoS type;
means for selecting data for a transmit data packet from the packet queue associated with the first QoS type;
means for aggregating the selected data into the transmit data packet, the aggregated transmit data packet including at least a portion of the first QoS type data from the first data packet and at least a portion of the first QoS type data from the second data packet;
means for contending for access to a communications channel according to at least one access parameter, wherein the at least one access parameter is based on a rank of the mesh point; and
means for transmitting the transmit data packet during a transmission opportunity duration.

20. The apparatus of claim 19, wherein at least a portion of the data in the first data packet or the data in the second data packet is second QoS type data, and the storing module is further configured to parse the data into either the packet queue associated with the first QoS type or a second packet queue associated with a second packet type.

21. The apparatus of claim 19, wherein the at least one access parameter comprises an arbitration interframe space (AIFS) period, the apparatus further comprising means for adjusting the AIFS period to control data flow rate.

22. The apparatus of claim 19, wherein the at least one access parameter comprises an arbitration interframe space (AIFS) period, the apparatus further comprising means for adjusting the AIFS period to control channel access frequency.

23. The apparatus of claim 19, wherein the at least one access parameter comprises a contention access window, the apparatus further comprising means for adjusting the contention access window to control data flow rate.

24. The apparatus of claim 19, wherein the at least one access parameter comprises a contention access window, the apparatus further comprising means for adjusting the contention access window to control channel access frequency.

25. The apparatus of claim 19, wherein the at least one access parameter comprises the transmission opportunity duration, the apparatus further comprising means for adjusting the transmission opportunity duration to control data flow rate.

26. The apparatus of claim 19, wherein the at least one access parameter comprises the transmission opportunity duration, the apparatus further comprising means for adjusting the transmission opportunity duration to control channel access frequency.

27. The method of claim 1, wherein the at least one access parameter is further based on the quality of service type of the selected data.

\* \* \* \* \*